United States Patent
Mihailovski

[15] 3,694,451
[45] Sept. 26, 1972

[54] CERTAIN 2-PHOSPHORYLIMINO-4-THIAZOLINES

[72] Inventor: Alexander Mihailovski, Berkeley, Calif.

[73] Assignee: Stauffer Chemical Company, New York, N.Y.

[22] Filed: March 26, 1970

[21] Appl. No.: 23,051

[52] U.S. Cl.............................260/306.7, 424/200
[51] Int. Cl...........................................C07d 91/26
[58] Field of Search...................................260/306.7

[56] References Cited

UNITED STATES PATENTS 3,053,847  9/1962  Schicke ..................260/306.7
3,428,645  2/1969  Greco......................260/306.7

Primary Examiner—Alex Mazel
Assistant Examiner—R. J. Gallagher
Attorney—Daniel C. Block, Edwin H. Baker and Albert J. Adamcik

[57] ABSTRACT

New compounds corresponding to the formula

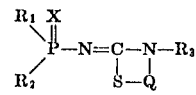

wherein X is oxygen and sulfur; $R_1$ is lower alkyl, lower alkoxy, lower alkylthio and chloro; $R_2$ is lower alkyl, lower alkoxy, lower alkylthio and chloro; $R_3$ is lower alkyl, benzyl, aryl, lower alkoxyalkyl, alkenyl, chloroalkenyl and alkynyl; Q is

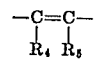

in which $R_4$ and $R_5$ are independently hydrogen, lower alkyl, halogen and nitro.

26 Claims, No Drawings

CERTAIN 2-PHOSPHORYLIMINO-4-THIAZOLINES

The above-mentioned compounds are biologically effective as pesticides, especially against insects and acarids.

The present invention is concerned with a novel group of organo-phosphorus compounds, their method of preparation and their use as pesticides especially effective against insects and acarids.

The novel compounds are represented by the general formula

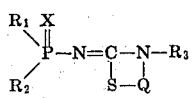

wherein X is oxygen and sulfur; $R_1$ is lower alkyl, lower alkoxy, lower alkylthio and chloro; $R_2$ is lower alkyl, lower alkoxy, lower alkylthio and chloro; $R_3$ is lower alkyl, aryl, lower alkoxyalkyl, alkenyl, chloroalkenyl and alkynyl; Q is

in which $R_4$ and $R_5$ are independently hydrogen, lower alkyl, halogen, and nitro.

The compounds of the instant invention are prepared according to the following general description of the synthetic procedure. Compounds of the form:

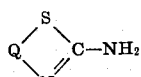

are treated with an appropriate $R_3$-halide in a polar solvent e.g., methanol or ethanol) at room temperature or at elevated temperature as required. Potassium iodide may be used as a catalyst for the less reactive halides. The products from this reaction have the general structure

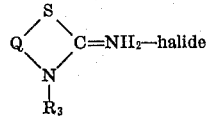

The free imino base

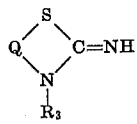

is obtained after dissolving the imino salt (2) in water and adding one equivalent, or more, of strong base (e.g., sodium hydroxide solution).

Either the iminium salt (2) with two molar equivalents of base as acid acceptor or the free imine base in molar excess or with one molar equivalent of another base is phosphorylated using an alkoxy chlorothionophosphate (-phosphonate) in an inert solvent. This reaction is exothermic and the reaction temperature is held below 45°C. by cooling. Bases which can be used as acid acceptors are sodium hydroxide, potassium carbonate, potassium hydrogen carbonate or tertiary amines such as triethylamine. Suitable solvents are acetone, methylene chloride, benzene or heterogeneous mixtures such as benzene/water. The final product isolates have the general structure

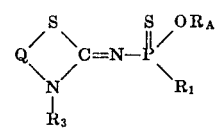

wherein $R_A$ is lower alkyl.

The thionophosphor (-phosphon) amides (4) are rearranged to thiolophosphor- (thiolosphosphon-) amides (5) by dissolving them in an inert solvent (e.g., benzene, benzene/hexane) and refluxing with alkyliodide (e.g., methyliodide, ethyliodide) or by refluxing them directly in the alkyl iodide. The products are purified by evaporating the solvent and alkyl iodide reagent, redissolving the crude product in a non-polar solvent such as benzene to precipitate the polar, solid by-product usually accompanying the rearrangement. The benzene solution is filtered and the solvent removed to give the final product which can be still purified by recrystallization or chromatography. The products have the general thiolo structure (5).

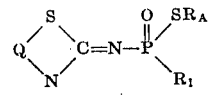

wherein $R_A$ is lower alkyl.

In the above formulas (1), (2), (3), (4) and (5), Q is

wherein $R_4$ and $R_5$ are independently hydrogen, lower alkyl, halogen and nitro.

EXAMPLE I 2-(O,O-Diethylthiophosphorylimino)-3-methyl-4-thiazoline

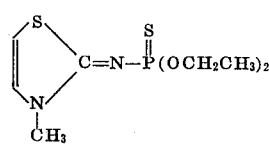

A 1-liter four-neck round bottom flask was charged with 40.0 grams (0.166 moles) 2-imino-3-methyl-4-thiazoline hydrogen iodide, 200 ml. benzene, and 53.0 g. (0.332 equivalents) 25 percent (w/w) sodium hydroxide solution. To this mixture were added dropwise with stirring and cooling 32.3 g. (0.166 moles)

0,0-diethyl chlorothiophosphate dissolved in 60 ml. benzene. The reaction mixture was stirred at ambient temperature for a further three hours. The benzene layer was separated and the aqueous phase extracted twice with 50 ml. portions of benzene. The combined benzene fractions were washed twice with 50 ml. portions of 5% NaHCO₃, dried and the solvent was evaporated to leave a tan-colored solid. This was recrystallized from petroleum ether/benzene. Some 34.0 g. of product were obtained, m.p. 44°–46°C. Yield, 77 percent of theory.

Anal. Calc'd. for $C_8H_{15}N_2O_2PS_2$: C, 36.08; H, 5.68; N, 10.52; S, 24.08

Found: C, 35.99; H, 5.75; N, 10.92; S, 24.07

The infrared spectrum of this compound (KBr pellet) showed a strong, broad band at 1580 cm⁻¹

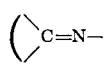

vibration), and strong bands at 1040 cm⁻¹, 1020 cm⁻¹ and 780 cm⁻¹ (P-O-C stretch).

The proton magnetic resonance spectrum showed a triplet centered at δ1.33 for six methyl protons of the ethoxy groups ($J_{HH}$ 7Hz), a singlet at δ3.47 for three N-methyl protons, a doublet of quartets centered at δ4.11 for four methylene protons of the ethoxy groups ($J_{HH}$ 7Hz; $J_{HP}$ 9Hz), and a multiplet between δ6.25 and δ6.45 for one unsaturated proton adjacent to the ring sulfur atom and a multiplet between δ6.70 and δ6.90 for one unsaturated proton next to the ring nitrogen atom.

EXAMPLE II 2-(O-Ethyl-S-methylthiophosphorylimino)-3-methyl-4-thiazoline

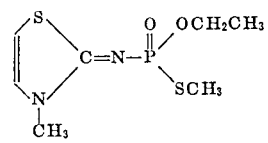

In a solvent system consisting of 30 ml. benzene and 40 ml. n-hexane were dissolved 11.6 g. (0.0436 moles) 2-(O,O-diethylthiophosphorylimino)-3-methyl-4-thiazoline and 18.6 g. (0.131 moles) methyliodide. This solution was refluxed for 2½ hours. The volatiles were evaporated and the residual oil was dissolved in 100 ml. benzene. On standing at room temperature overnight, a small amount of solid precipitated. The solution was filtered and the solvent evaporated giving 10.3 g. of a pale-yellow, viscous liquid. Yield, 89 percent of theory.

Anal. Calc'd. for $C_7H_{13}N_2O_2PS_2$: C, 33.32; H, 5.19; N, 11.11; S, 25.42

Found: C, 33.77; H, 5.36; N, 10.65; S, 25.47

The infrared spectrum (liquid film) showed a strong, broad band at 1555 cm⁻¹

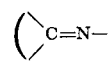

vibration), a strong band at 1220 cm⁻¹ (P=O), and a strong band at 1040 cm⁻¹ and a medium intensity band at 780 cm⁻¹ (P-O-C stretch).

The proton magnetic resonance spectrum of this compound displayed a triplet centered at δ1.39 for the three methyl protons of the ethoxy group ($J_{HH}$ 7Hz), a doublet centered at δ2.27 for three thiomethoxy protons ($J_{HP}$ 13Hz), a singlet at δ3.48 for three N-methyl protons, a multiplet between δ3.9 and δ4.5 for two methylene protons of the ethoxy group, a doublet of doublets for one unsaturated proton, next to the ring sulfur atom, centered at δ6.38 ($J_{HH}$ 5Hz; $J_{HP}$ 1.4Hz) and a doublet of doublets centered at δ6.82 for one unsaturated proton adjacent to the ring nitrogen ($J_{HH}$ 5Hz; $J_{HP}$ 2Hz).

The other compounds are prepared in an analogous manner starting with the appropriate reagents as outlined hereinabove.

The following is a table of compounds representative of those embodied in the present invention. Compound numbers have been assigned to them and are used for identification throughout the balance of the specification.

TABLE I

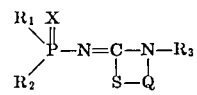

wherein Q is

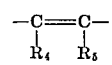

| Compound Number | X | R₁ | R₂ | R₃ | R₄ | R₅ |
|---|---|---|---|---|---|---|
| 1 | S | CH₃O | CH₃O | CH₃ | H | H |
| 2 | O | CH₃O | CH₃S | CH₃ | H | H |
| 3 | O | C₂H₅O | CH₃S | CH₃ | H | H |
| 4 | O | C₂H₅O | C₂H₅S | CH₃ | H | H |
| 5 | S | C₂H₅O | C₂H₅O | CH₃ | H | H |
| 6 | S | CH₃O | CH₃O | C₂H₅ | H | H |
| 7 | O | CH₃O | CH₃S | C₂H₅ | H | H |
| 8 | S | CH₃O | CH₃O | CH₂C≡CH | H | H |
| 9 | O | CH₃O | CH₃S | CH₂C≡CH | H | H |
| 10 | S | CH₃O | CH₃O | CH₂-⟨⟩ | H | H |
| 11 | O | CH₃O | CH₃S | CH₂-⟨⟩ | H | H |
| 12 | S | CH₃O | CH₃O | CH₂CH=CH₂ | H | H |
| 13 | O | C₂H₅O | C₂H₅O | CH₃ | H | H |
| 14 | O | CH₃O | CH₃S | CH₂CH=CH₂ | H | H |
| 15 | S | CH₃O | CH₃O | CH₂CH=CCl₂ | H | H |
| 16 | O | CH₃O | CH₃S | CH₂CH=CCl₂ | H | H |
| 17 | S | CH₃O | CH₃O | CH₃ | H | CH₃ |

| 18 | O | CH$_3$O | CH$_3$S | CH$_3$ | | H | CH$_3$ |
| 19 | S | CH$_3$O | CH$_3$O | CH$_3$ | | CH$_3$ | CH$_3$ |
| 20 | O | CH$_3$O | CH$_3$S | CH$_3$ | | CH$_3$ | CH$_3$ |
| 21 | S | C$_2$H$_5$ | C$_2$H$_5$O | CH$_3$ | | H | H |
| 22 | O | C$_2$H$_5$ | CH$_3$S | CH$_3$ | | H | H |
| 23 | S | C$_2$H$_5$ | C$_2$H$_5$ | CH$_3$ | | H | H |
| 24 | O | C$_2$H$_5$O | Cl | CH$_3$ | | H | H |
| 25 | O | CH$_3$O | CH$_3$S | CH$_3$ | | Cl | H |

Systemic Evaluation Test—This test evaluates the systemic toxicity by root absorption and upward translocation of the candidate systemic compound. The two-spotted mite, Tetranychus urticae (Koch) and the bean aphid, Aphis fabae (Scop.), are employed in tests for systemic activity. Young pinto bean plants in the primary leaf stage are used as host plants for the two-spotted mite. The pinto beam plants are placed in bottles containing 200 ml. of the test solution and held in place with cotton plugs. Only the roots are immersed. The solutions are prepared by dissolving the compounds to be tested in a suitable solvent, usually acetone, and then diluting with distilled water. The final acetone concentration never exceeds about 1 percent. Immediately after the plants are placed in the test solution, they are infested with the test species. Mortalities are determined after 7 days. The percentage kill is determined by comparison with control plants which are placed in distilled water only. The LD–50 value is calculated using well-known procedures. LD–50 values for the two-spotted mite are found in Table II under column 2SM–SYS.; and for bean aphid under column BAS.

Young nasturtium plants, Tropaeolum sp., are used as the host plants for the bean aphid. The host plants are transplanted into 1 pound of soil that has been treated with the candidate compound. Immediately after planting in the treated soil the plants are infested with the aphids. Concentrations of toxicants in the soil ranged from 10 ppm per pound of soil downward until an LD–50 value is obtained. Mortality is recorded after 72 hours. Comparison is made with control plants placed in untreated soil.

Insecticidal Evaluation Tests—The following insect species are subjected to evaluation tests for insecticidal activity.

1. Housefly (HF) - *Musca domestica* (Linn.)
2. Lygus Bug (LB) - *Lygus hesperus* (Knight)

Aliquots of the toxicants, dissolved in an appropriate solvent, are diluted in water containing 0.002 percent of a wetting agent, Sponto 221 - (a polyoxyether of alkylated phenols blended with organic sulfonates). Test concentrations range from 0.1 percent downward to that at which 50 percent mortality is obtained. In the tests, for these species, 10 1-month old nymphs of the lygus bug are placed in a circular cardboard cage sealed on one end with cellophane and covered by a cloth netting on the other. Test concentrations for the lygus bug ranged from 0.05 percent downward to that at which 50 percent mortality was obtained. Each of the aqueous suspensions of the candidate compounds are sprayed onto the insects through the cloth netting by means of a hand spray gun. Percent mortality in each case is recorded after 72 hours, and the LD–50 values expressed as percent of toxicant in the aqueous spray is recorded. The results are in Table II under column LB.

The following procedure is used to test houseflies. A stock solution containing 0.1 percent by weight of the toxicant in an appropriate solvent is prepared. Aliquots of this solution are combined with 1 milliliter of an acetone-peanut oil solution in an aluminum dish and allowed to dry. The aliquots are selected to achieve desired toxicant concentration ranging from 0.1 percent per Petri dish to that at which 50 percent mortality was attained. The Petri dishes are placed in a circular cardboard cage, closed on the bottom with cellophane and covered on top with cloth netting. 25 female houseflies are introduced into the cage and the percent mortality is recorded after 48 hours. The LD–50 values are expressed in terms of percent concentration or μg per 25 female flies. LD–50 values obtained in the above-mentioned housefly test are found in Table II under column HF.

Systemic Test—Salt-Marsh Caterpillar—*Estigmene acrea* (Drury) - Aliquots of the toxicant dissolved in appropriate solvent are diluted in water and placed in glass bottles. Concentrations of active ingredient range from 10 ppm to that at which 50 percent mortality is obtained. Kidney beans, *Phaseolus vulgaris*, supported by cotton plugs, are inserted into the solution so that the roots and major portion of the stem are completely immersed. Salt-marsh caterpillar egg masses (10 to 30 eggs) on small pieces of tissue paper are pinned to the kidney bean leaves and allowed to hatch. Mortality is recorded after five days and the LD–50 values are expressed as parts per million (ppm) of toxicant in the aqueous solution. The values are found in Table II under the column SMC–SYS.

The compounds are also active against two-spotted mite (2–SM), *Tetranychus urticae* (Koch). Lima bean plants, *Phaseolus sp.*, are utilized as the host plant and infested with 50 to 75 mites of various ages. 24 hours after infestation they are sprayed to the point of run off with aqueous suspension of the toxicant. Test concentrations range from 0.05 percent to that at which 50 percent mortality is obtained. The values obtained in this test are found in Table II under the columns 2SM–PE and 2SM–EGGS.

The compounds are also active against bean aphid, *Aphis fabae* (Scop.), as a contact toxicant. The same test procedure as given for the two-spotted mite above is used for the bean aphid except nasturtium, *Tropaeolum sp.*, plants approximately 2 to 3 inches tall are used as the host plant. The LD–50 values obtained for the compounds of this invention are found in Table II under column BA.

TABLE II

Insecticidal Evaluation Results

LD-50 Values

| Compound No. | HF(μg/25 ♀) | LB (%) | BA (%) | BAS (ppm) | SMC SYS (ppm) | 2SM PE (%) | 2SM eggs (%) | SYS (ppm) |
|---|---|---|---|---|---|---|---|---|
| 1 | >100.0 | >.05 | >.05 | .8 | | .03 | .05 | >10.0 |
| 2 | 50.0 | .003 | .003 | .8 | >10.0 | .03 | .03 | 3.0 |
| 3 | 45.0 | .003 | .03 | .3 | >10.0 | .01 | .01 | 8.0 |
| 4 | 90.0 | .003 | >.05 | | | .03 | .03 | 8.0 |
| 5 | >100.0 | | >.05 | | | >.05 | >.05 | |
| 6 | >100.0 | .03 | .05 | .05 | >10.0 | .05 | >.05 | 3.0 |
| 7 | 70.0 | .001 | .01 | .03 | >10.0 | .03 | >.05 | |
| 8 | 30.0 | .05 | >.05 | | | .03 | >.05 | 8.0 |
| 9 | 10.0 | .003 | .03 | 3.0 | >10.0 | .03 | .03 | 8.0 |
| 10 | >100.0 | | >.05 | | | >.05 | >.05 | |
| 11 | >100.0 | | >.05 | | | >.05 | .05 | |

| | | | | | | | |
|---|---|---|---|---|---|---|---|
| 12 | 100.0 | | >.05 | | | .05 | .05 |
| 13 | >100.0 | | >.05 | | | >.05 | >.05 |
| 14 | 75.0 | .01 | .03 | >10.0 | | .05 | .05 | .8
| 15 | 100.0 | >.05 | >.05 | | | >.05 | >.05 | .8
| 16 | 100.0 | >.05 | >.05 | | | >.05 | >.05 |
| 17 | >100.0 | | .05 | | | >.05 | >.05 |
| 18 | >100.0 | | .05 | | | .03 | >.05 |
| 19 | >100.0 | | >.05 | | | >.05 | >.05 |
| 20 | >100.0 | | >.05 | | | >.05 | >.05 |
| 21 | >100.0 | >.05 | >.05 | 10.0 | | .05 | >.05 |
| 22 | 50.0 | .003 | .0003 | .8 | .8 | .008 | .03 | 3.0
| 23 | >100.0 | >.05 | >.05 | | | >.05 | >.05 |
| 24 | >100.0 | | >.05 | | | >.05 | >.05 |
| 25 | >100.0 | >.05 | .05 | >10.0 | | .03 | .03 | 3.0

What is claimed is:

1. A composition of matter corresponding to the formula

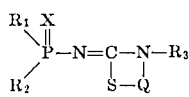

wherein X is independently selected from oxygen and sulfur; $R_1$ is independently selected from lower alkyl having one to three carbon atoms, lower alkoxy having one to three carbon atoms, lower alkylthio having one to three carbon atoms and chloro; $R_2$ is independently selected from lower alkyl having one to three carbon atoms, lower alkoxy having one to three carbon atoms, lower alkylthio having one to three carbon atoms and chloro; $R_3$ is independently selected from lower alkyl having one to three carbon atoms, benzyl, alkenyl having one to three carbon atoms, chloroalkenyl having one to three carbon atoms and alkynyl having one to three carbon atoms; and Q is

wherein $R_4$ and $R_5$ are independently selected from hydrogen, lower alkyl having one to three carbon atoms, and halogen.

2. The composition as set forth in claim 1 wherein X is sulfur, $R_1$ is methoxy, $R_2$ is methoxy, $R_3$ is methyl and $R_4$ and $R_5$ are hydrogen.

3. The composition as set forth in claim 1 wherein X is oxygen, $R_1$ is methoxy, $R_2$ is methylthio, $R_3$ is methyl and $R_4$ and $R_5$ are hydrogen.

4. The composition as set forth in claim 1 wherein X is oxygen, $R_1$ is ethoxy, $R_2$ is methylthio, $R_3$ is methyl and $R_4$ and $R_5$ are hydrogen.

5. The composition as set forth in claim 1 wherein X is oxygen, $R_1$ is ethoxy, $R_2$ is ethylthio, $R_3$ is methyl and $R_4$ and $R_5$ are hydrogen.

6. The composition as set forth in claim 1 wherein X is sulfur, $R_1$ and $R_2$ are ethoxy, $R_3$ is methyl and $R_4$ and $R_5$ are hydrogen.

7. The composition as set forth in claim 1 wherein X is sulfur, $R_1$ and $R_2$ are methoxy, $R_3$ is ethyl and $R_4$ and $R_5$ are hydrogen.

8. The composition as set forth in claim 1 wherein X is oxygen, $R_1$ is methoxy, $R_2$ is methylthio, $R_3$ is ethyl and $R_4$ and $R_5$ are hydrogen.

9. The composition as set forth in claim 1 wherein X is sulfur, $R_1$ and $R_2$ are methoxy, $R_3$ is propynyl and $R_4$ and $R_5$ are hydrogen.

10. The composition as set forth in claim 1 wherein X is oxygen, $R_1$ is methoxy, $R_2$ is methylthio, $R_3$ is propynyl and $R_4$ and $R_5$ are hydrogen.

11. The composition as set forth in claim 1 wherein X is sulfur, $R_1$ and $R_2$ are methoxy, $R_3$ is benzyl and $R_4$ and $R_5$ are hydrogen.

12. The composition as set forth in claim 1 wherein X is oxygen, $R_1$ is methoxy, $R_2$ is methylthio, $R_3$ is benzyl and $R_4$ and $R_5$ are hydrogen.

13. The composition as set forth in claim 1 wherein X is sulfur, $R_1$ and $R_2$ are methoxy, $R_3$ is 2-propenyl and $R_4$ and $R_5$ are hydrogen.

14. The composition as set forth in claim 1 wherein X is oxygen, $R_1$ and $R_2$ are ethoxy, $R_3$ is methyl and $R_4$ and $R_5$ are hydrogen.

15. The composition as set forth in claim 1 wherein X is oxygen, $R_1$ is methoxy, $R_2$ is methylthio, $R_3$ is 2-propenyl and $R_4$ and $R_5$ are hydrogen.

16. The composition as set forth in claim 1 wherein X is sulfur, $R_1$ and $R_2$ are methoxy, $R_3$ is dichloropropenyl and $R_4$ and $R_5$ are hydrogen.

17. The composition as set forth in claim 1 wherein X is oxygen, $R_1$ is methoxy, $R_2$ is methylthio, $R_3$ is dichloropropenyl and $R_4$ and $R_5$ are hydrogen.

18. The composition as set forth in claim 1 wherein X is sulfur, $R_1$ and $R_2$ are methoxy, $R_3$ is methyl, $R_4$ is hydrogen and $R_5$ is methyl.

19. The composition as set forth in claim 1 wherein X is oxygen, $R_1$ is methoxy, $R_2$ is methylthio, $R_3$ is methyl, $R_4$ is hydrogen, $R_5$ is methyl.

20. The composition as set forth in claim 1 wherein X is sulfur, $R_1$ and $R_2$ are methoxy and $R_3$, $R_4$ and $R_5$ are methyl.

21. The composition as set forth in claim 1 wherein X is oxygen, $R_1$ is methoxy, $R_2$ is methylthio and $R_3$, $R_4$ and $R_5$ are methyl.

22. The composition as set forth in claim 1 wherein X is sulfur, $R_1$ is ethyl, $R_2$ is ethoxy, $R_3$ is methyl and $R_4$ and $R_5$ are hydrogen.

23. The composition as set forth in claim 1 wherein X is oxygen, $R_1$ is ethyl, $R_2$ is methylthio, $R_3$ is methyl and $R_4$ and $R_5$ are hydrogen.

24. The composition as set forth in claim 1 wherein X is sulfur, $R_1$ and $R_2$ are ethyl, $R_3$ is methyl, and $R_4$ and $R_5$ are hydrogen.

25. The composition as set forth in claim 1 wherein X is oxygen, $R_1$ is ethoxy, $R_2$ is chlorine, $R_3$ is methyl and $R_4$ and $R_5$ are hydrogen.

26. The composition as set forth in claim 1 wherein X is oxygen, $R_1$ is methoxy, $R_2$ is methylthio, $R_3$ is methyl, $R_4$ is chlorine, and $R_5$ is hydrogen.

* * * * *